Feb. 24, 1925.　　　　　　　　　　　　　　　　1,527,960
B. J. TEACH
DEPOSITORY PASS BOOK
Filed Jan. 19, 1924
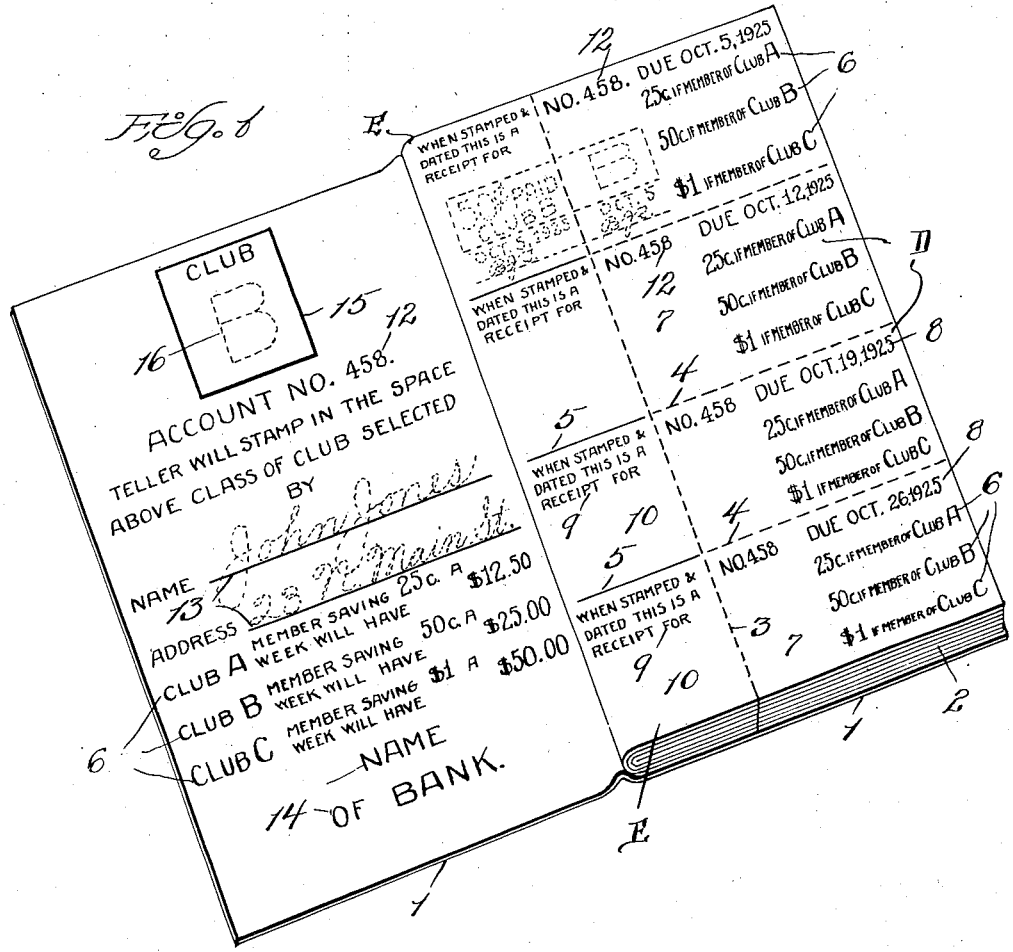
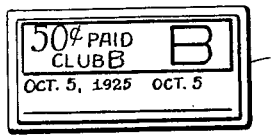
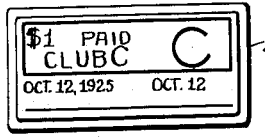
INVENTOR
BRUNO J. TEACH,
ATTORNEY.

Patented Feb. 24, 1925.

1,527,960

UNITED STATES PATENT OFFICE.

BRUNO J. TEACH, OF ST. LOUIS, MISSOURI, ASSIGNOR TO THE NATIONAL ADVERTISING CORPORATION, OF ST. LOUIS, MISSOURI, A CORPORATION OF MISSOURI.

DEPOSITORY PASS BOOK.

Application filed January 19, 1924. Serial No. 687,345.

*To all whom it may concern:*

Be it known that I, BRUNO J. TEACH, a citizen of the United States, residing at the city of St. Louis, State of Missouri, have invented a certain new and useful Improvement in Depository Pass Books, of which the following is a specification, reference being had to the accompanying drawing, forming a part thereof.

This invention relates generally to passbooks and, more particularly, to a certain new and useful improvement in pass-books of the coupon depository type.

So-called "Christmas savings clubs" have in recent years become as is well known, firmly established in connection with banks and other financial institutions, both on account of their direct and indirect profit and benefit to both the bank and its patrons. Some of such "clubs" embody as a feature the employment of pass-books having designated spaces for the entry by the bank-teller or other official of the amount deposited at stated or different intervals, while others embody the use of series of individual deposit-coupons each of fixed or definite amount or denomination and usually of fixed due-date. With the latter "clubs," which are, so far as I am aware, the more popular, the banking institution, however, inasmuch as the amounts deposited at stated intervals by different patrons vary, is necessarily required to have at hand to meet the wishes or desires of its customers, quite a number of couponbooks of different denominations, many of which are eventually waste, and due to which the expense to the banking institution of maintaining or carrying on this department of its business is more or less greatly increased with a consequent decrease in profit and earnings. Such coupon deposit-books, moreover, are only capable of selection by the customer on a direct call and request at the banking institution and, inasmuch also as the banking institution cannot in advance foretell the amount a prospective customer may wish to deposit at stated intervals and the expense of mailing a number of coupondeposit books of different fixed denominations to and for selection by each prospective customer would be prohibitive, such coupon deposit-books, it is quite evident, do not lend themselves to profitable direct mail advertising by the bank in the solicitation of depositors or accounts.

My present invention has hence for its chief object the provision of a depository pass-book of the coupon type which is applicable initially to savings clubs of a plurality of different classes, that is to say, applicable initially for selective adoption by different patrons desiring to deposit, respectively, different amounts at stated intervals, and which, on and after such selection by a particular patron and the indicating correspondingly thereon by the banking institution, by, for instance, a suitable designating symbol, legend, or the like, becomes applicable to only one class or club and is, in such manner, converted into a depository pass-book of the coupon type requiring the deposit at stated intervals of fixed, definite amounts.

A further object of my present invention is to provide a pass-book of the kind and for the purpose stated in which the coupons and their stubs are so formed, arranged, and combined as to permit not only of ready separation and removal from the book of the coupons only, but also simultaneous or joint "marking" of both stub and coupon for conversion of the stub into a depositor's receipt and the coupon into a deposit-slip for the bank.

With the above and other objects in view, my present invention resides in the novel features of form, construction, and arrangement of parts hereinafter described and pointed out in the claims.

In the accompanying drawing,

Figure 1 illustrates in open perspective a pass-book embodying my invention;

Figure 2 shows the back or reverse side of a detached coupon or deposit-slip; and Figures 3 and 4 illustrate stamping and receipting devices employed conjointly with the coupons or deposit-slips and their stubs or depositor's receipts of the pass-book of Figure 1.

Referring now more in detail and by reference characters to the drawing, which illustrates a preferred embodiment of my invention, 1 designates the cover of the passbook, permanently bound at an edge within which in superposed relation is a group of sheets or pages 2, which are each, preferably in registration, scored or perforated, as at 3, for convenient separation longitudinally or from top to bottom. The line of scoring or perforations 3 is, as clearly seen in Figure 1, somewhat adjacent the bound edge of the sheets or pages 2, which are each also, preferably again, in registration, provided or formed transversely with a plurality of lines of scoring or perforations, as at 4, 4, which extend from the line of scoring 3 to the free edges, and which are in definite spaced relation longitudinally, of the sheets 2. Each sheet 2 is thus divided not only into a plurality of coupons D readily separable from one another and from the cover 1, but also into a plurality of coupon-stubs E inseparable from the cover 1 and corresponding in number with the coupons D, the several stubs E of each sheet 2 being preferably divided one from the other by lines of marking 5. It will be understood that the pass-book as a whole is preferably of such size and thickness for convenient carrying in the pocket of a garment and that the several sheets 2 are divided into any suitable number of coupons D and stubs E.

Each of the coupons D essentially bears preferably upon the right-hand portion of its face in neat, parallel arrangement a plurality of legends or the like 6, such as, for instance, "25¢ if member of club A," "50¢ if member of club B," "$1.00 if member of club C," and so on, designating selective deposit classes or clubs of different amount, the left-hand portion of its face being preferably clear and providing a space, as at 7, for the entry or stamping of a selected class or club designating symbol, as more fully hereinafter appears. Each of the coupons D also bears a due-date, as at 8, and, as shown, the dates 8 are progressively or successively different on the several coupons D throughout the pass-book, whereby the depositor or customer is given notice of the exact successive times for payments or deposits, one coupon bearing the due-date "Oct. 5, 1925," the next coupon the due-date "Oct. 12, 1925," and so on throughout the series of coupons of the book.

Each stub E bears a receipting notation or legend 9, such, for instance, as "When stamped and dated this is a receipt for" and provides a space, as at 10, for receiving a receipting and dating stamp or marking by an officer of the particular banking institution.

On the reverse side of each respective coupon D, is a legend, as at 11, designating the total or aggregate amount paid by and to the credit of the depositor after all payments or deposits, including the payment or deposit called for by the particular coupon, have been made, it being understood that such total deposit designating legends are predetermined and are progressively increased with each coupon, and that each coupon so bears a plurality of such total or aggregate amount designations 11 corresponding with and respectively pertinent to the number of class or club designations 6 appearing on the face of the coupon.

On the inner face of preferably the front portion of the cover 1, permanently appears an account or customer designating symbol, such as a number, as at 12, and it will be observed that this same account-designating symbol appears upon each of the coupons D of the particular pass-book and thus identifies the coupons when detached with such account upon the bank's records; means, such as the blank-lines 13, for receiving the name of the customer for personally identifying the account; means such as the letters or characters 14 for identifying the depository or particular banking institution handling the account; and preferably also a plurality of the selective class or club legends or designations 6 corresponding with the class-legends both in number and kind appearing upon each of the coupons D of the pass-book. There also essentially appears upon the cover 1 a space, as at 15, within which the teller may suitably enter or otherwise record a designation or symbol 16, such as a letter of the alphabet, corresponding to the class designations of the coupons D indicating the particular class or club initially covered by the pass-book and selectively adopted by the customer, and to which class or club the particular pass-book thereafter becomes fixed.

For convenience in simultaneously marking and receipting the coupons D and their stubs E, I preferably employ suitable rubber-stamps 17, 18, such as are shown in Figures 3 and 4, which for economy are of the changeable variety, and each of which includes a particular class or club legend 6 and its designating symbol or letter 16 and entry or due-dates for application to both coupon D and stub E, together with blank lines, as shown, for the signature or name-initials upon the coupon D and stub E of the bank-teller or other official handling the deposit, the dates shown being readily changed, after the manner of the ordinary dating stamps.

It will be obvious that the type or printing upon the stamps 17 and 18 will, in actual practice, be opposite to that shown in Figures 3 and 4 or, in other words, will be backwards for the proper marking, as indicated by dotted lines in Figure 1, upon the several stub and deposit-sections or coupons.

My new pass-book, being constructed and including the several coupons D and stubs E as described, lends itself most advantageously and economically in direct mail-advertising by the particular banking institution and, on receipt by a prospective customer, may be most conveniently selected by him as pertaining to the particular class or club 6 to which he wishes membership. Upon such prospective customer or depositor then presenting the pass-book at the banking institution, informing the bank teller or other official of his desire to become a member of the particular class 6 of his selection, and making the corresponding initial deposit, say, for instance 50¢, which is the amount of the class B deposit, the bank-teller, as in the instance here shown, stamps in the space 15 the corresponding class designating symbol B and the pass-book thereafter pertains only to such class, the bank-teller at the same time by means of the stamp 17 and his initials designates and receipts the coupon D and its stub E, separates or detaches and then retains the so stamped coupon from the pass-book and returns the pass-book to the customer, the stub E of the detached coupon D thus becoming the depositor's receipt for his deposit and the so separated coupon D becoming the bank's deposit-slip.

Thus, the pass-book enables the recording of the transaction with speed, accuracy, simplicity, and efficiency. The pass-book is compact and readily mailable and handled, and, as will be observed, provides for a selective class of deposit—hence the single printed or otherwise prepared form answers most economically for a variety of depositors.

I am aware that minor changes in the form, construction, and arrangement of my new pass-book, its coupons, and stubs may be made and substituted for those herein shown and described without departing from the nature and principle of my invention.

Having thus described my invention, what I claim and desire to secure by Letters Patent is:

1. A depository pass-book for financial savings institutions, the same including a plurality of coupons, and a similar series of legends upon each coupon designating different depository classes according to the amount of deposit and adapting the pass-book selectively for permanent relationship to a definite one of such classes.

2. A depository pass-book for financial savings institutions, the same including a plurality of coupons in superposed relation, and a similar series of legends upon each coupon designating different depository classes according to the amount of deposit and adapting the pass-book selectively for permanent relationship to a definite one of such classes.

3. A depository pass-book for financial savings institutions, the same including a plurality of permanently bound superposed pages, each of which comprises a separable coupon, and a similar series of legends upon each said coupon designating different depository classes according to the amount of deposit and adapting the pass-book selectively for permanent relationship to a definite one of such classes.

4. A depository pass-book for financial savings institutions, the same including a plurality of coupons, a similar series of legends upon each coupon designating different depository classes according to the amount of deposit, and a designation for selectively relating all said coupons to a definite one of such classes.

5. A depository pass-book for financial savings institutions, the same including a cover, a plurality of coupons detachably bound within the cover, a similar series of legends upon each coupon designating different depository classes according to the amount of deposit, and a designation for selectively relating the cover and each of the coupons to a definite one of such classes.

6. A depository pass-book for financial savings institutions, the same including a cover, a plurality of superposed sheets permanently fixed at an edge to the cover, each sheet being divided to comprise a plurality of stubs and a plurality of coupons, the stubs being inseparable from the cover and the coupons being readily separable from the stubs and from each other, a similar series of legends upon each coupon designating different depository classes according to the amount of deposit, and a designation for selectively relating all said coupons to a definite one of such classes and thereby permanently converting the several coupons into deposit slips of a fixed definite amount.

In testimony whereof, I have signed my name to this specification.

BRUNO J. TEACH.